United States Patent

Malley et al.

[15] 3,690,383
[45] Sept. 12, 1972

[54] SOIL MOLDING HARVESTER PICKUP

[72] Inventors: William G. Malley, San Jose; David W. Cayton, Cupertino, both of Calif.

[73] Assignee: International Business Machines Corporation, Armonk, N.Y.

[22] Filed: Aug. 19, 1970

[21] Appl. No.: 65,046

[52] U.S. Cl. .................171/126, 171/1, 171/118, 172/44, 171/14, 56/327
[51] Int. Cl. .............................................A01d 17/06
[58] Field of Search....171/118, 126, 27, 1, 127, 131, 171/14, 106, 64; 56/327 R; 172/44

[56] References Cited

UNITED STATES PATENTS

| | | | |
|---|---|---|---|
| 2,747,354 | 5/1956 | Bloser | 171/118 |
| 2,537,198 | 1/1951 | Wetzel et al. | 171/126 |
| 2,544,744 | 3/1951 | Young | 171/126 |
| 1,809,626 | 6/1931 | Heglund | 171/126 |
| 2,954,085 | 9/1960 | Roberts | 172/44 |
| 2,718,110 | 9/1955 | Butler | 171/27 |
| 3,301,331 | 1/1967 | Looker et al. | 171/1 |

*Primary Examiner*—Antonio F. Guida
*Attorney*—F. W. Anderson and C. E. Tripp

[57] ABSTRACT

A vine crop pickup or harvesting mechanism has a leading rotating cutter bar that is advanced along a planting ridge under the surface of the soil for uprooting the vines and a trailing rotating elevator bar that is advanced above the surface of the soil to transfer the severed vines, and any loose fruit from the vines, onto a trailing removal conveyor. To prevent loose fruit and the vines from falling off the sides of the normally rounded planting ridge, soil crowding plates are disposed at the ends of the bars to raise a ramp of soil extending fore and aft of the bars at each side of the ridge, and also form an entrance throat for the vines and loose fruit.

3 Claims, 11 Drawing Figures

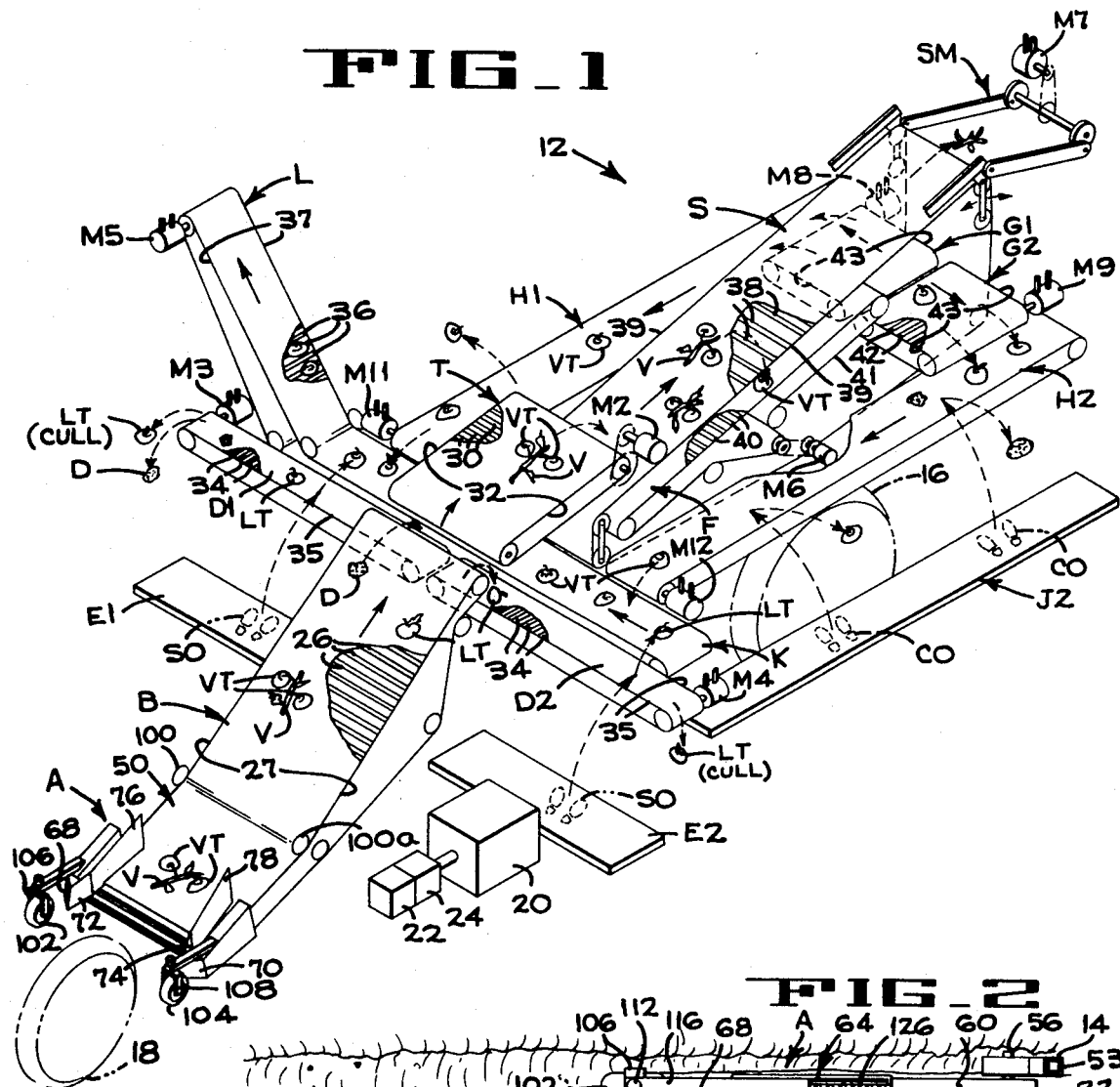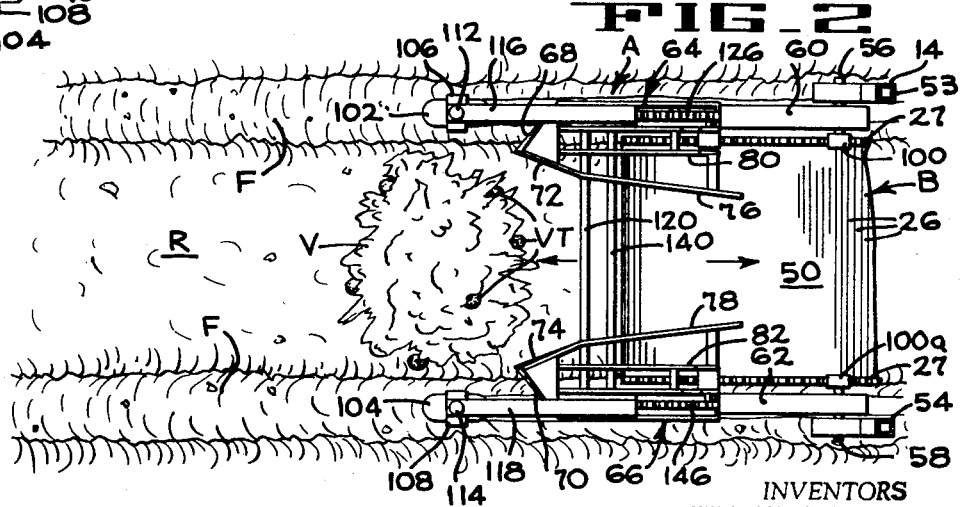

PATENTED SEP 12 1972　3,690,383
SHEET 2 OF 5
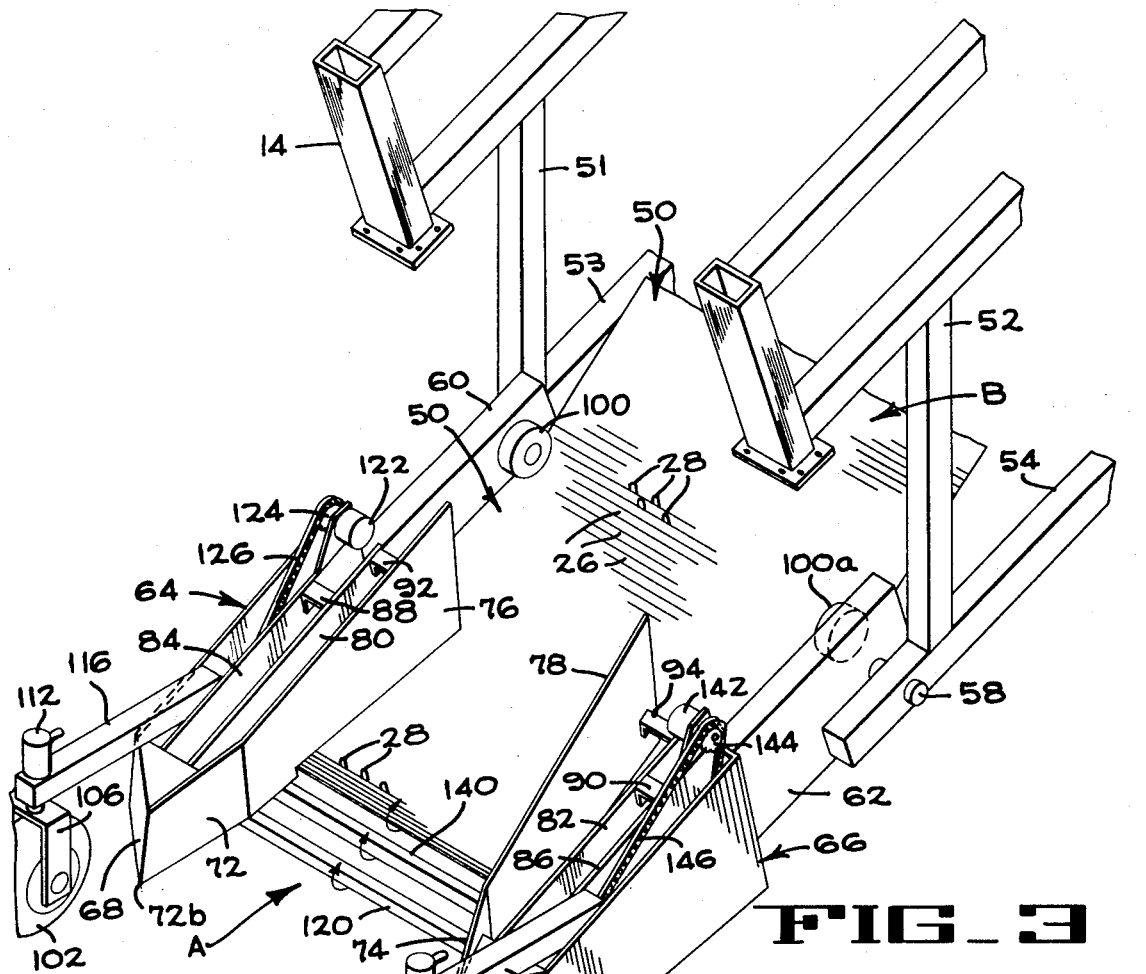
FIG_3
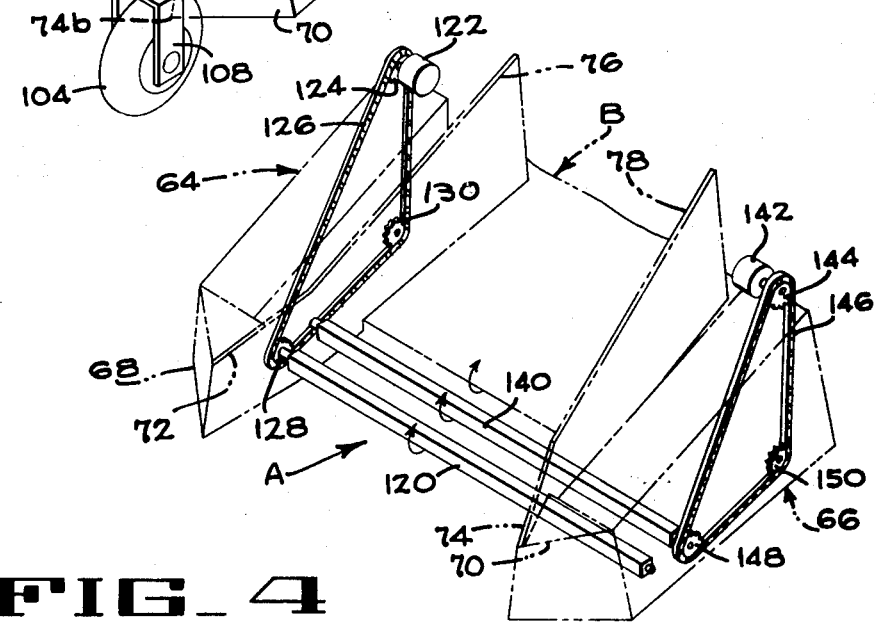
FIG_4

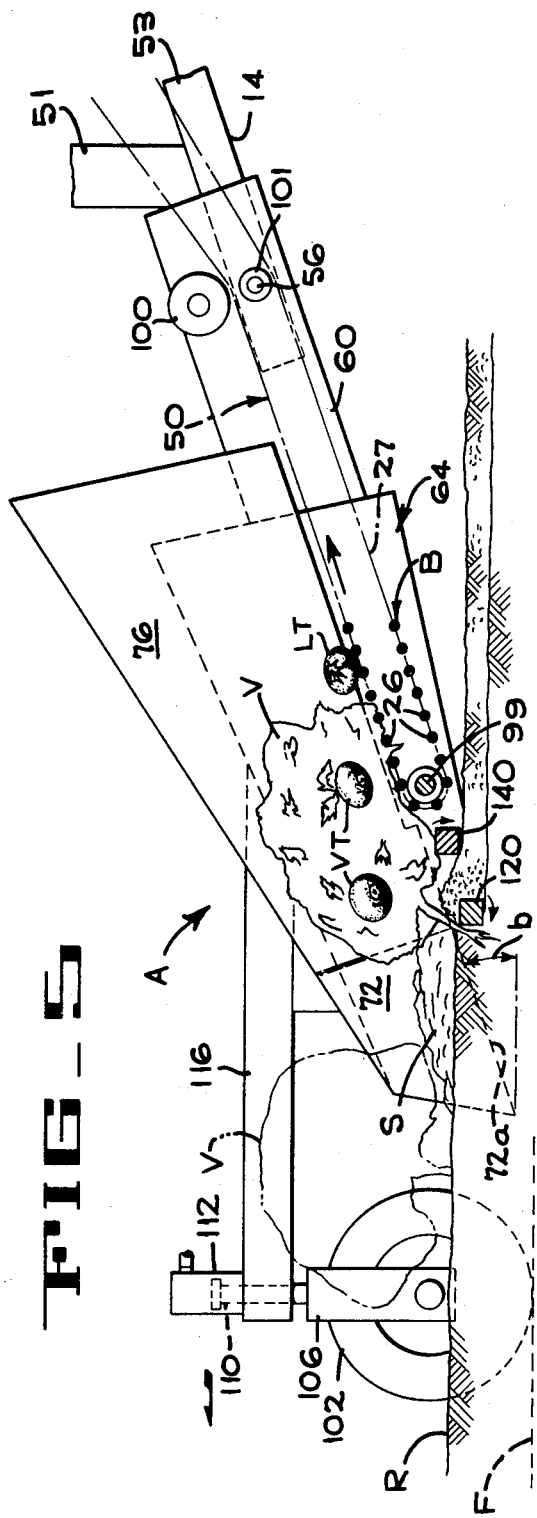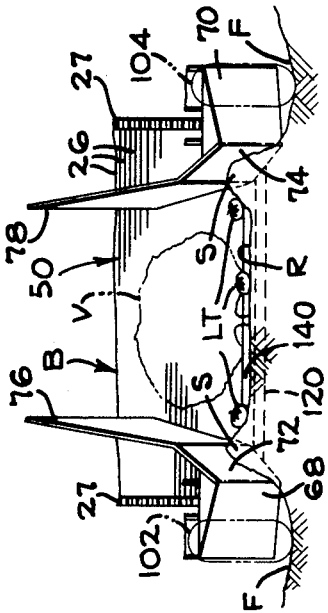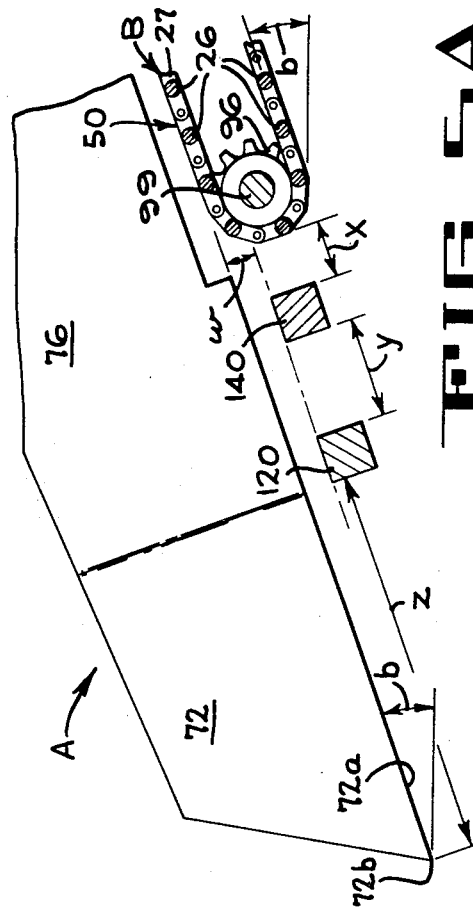

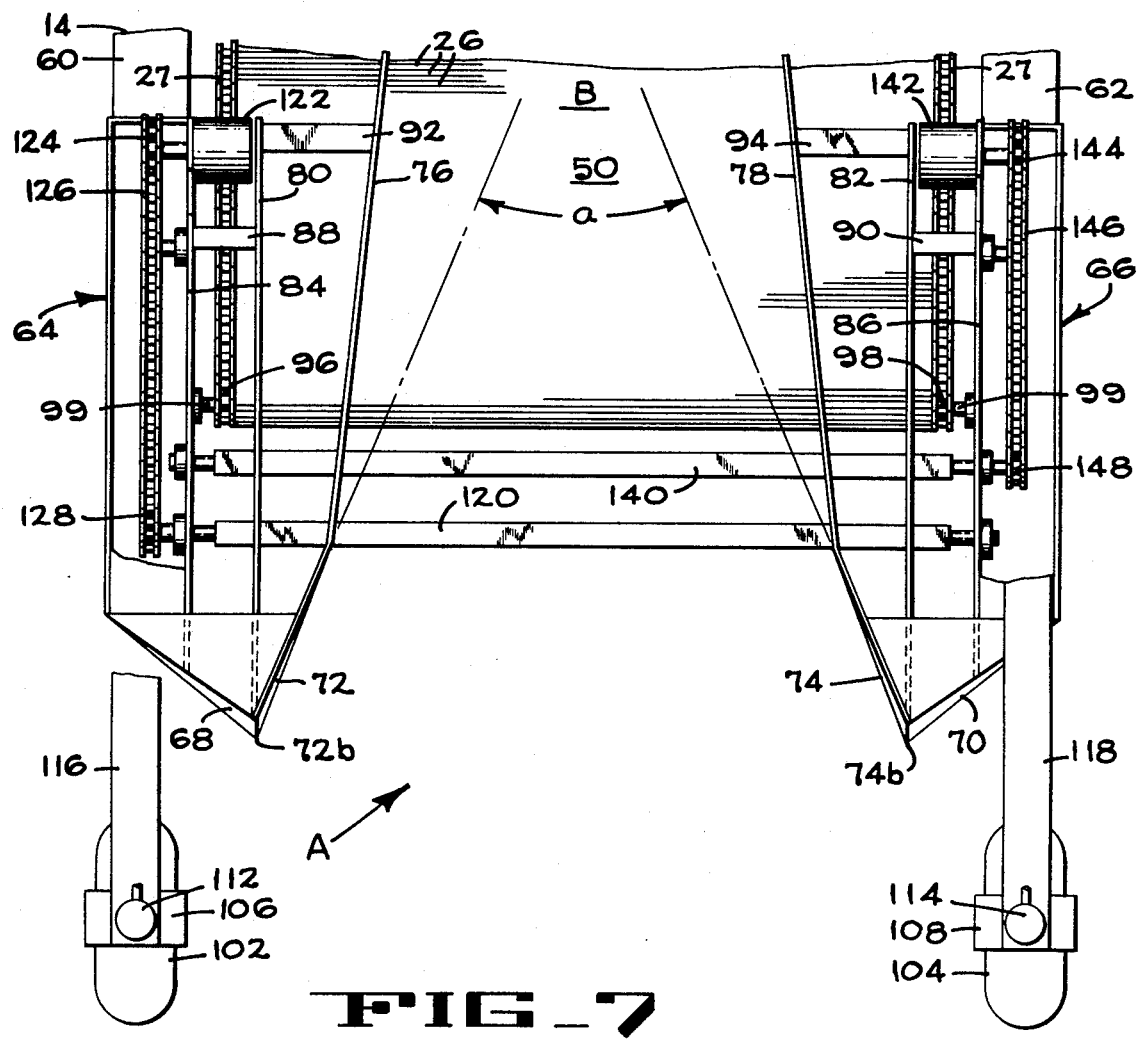
FIG_7
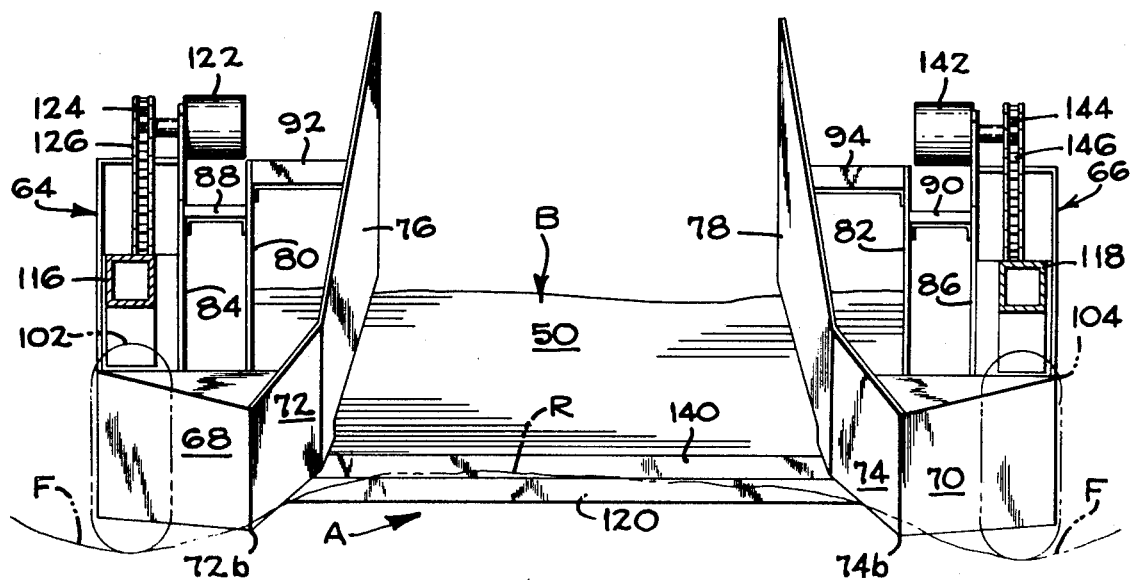
FIG_8

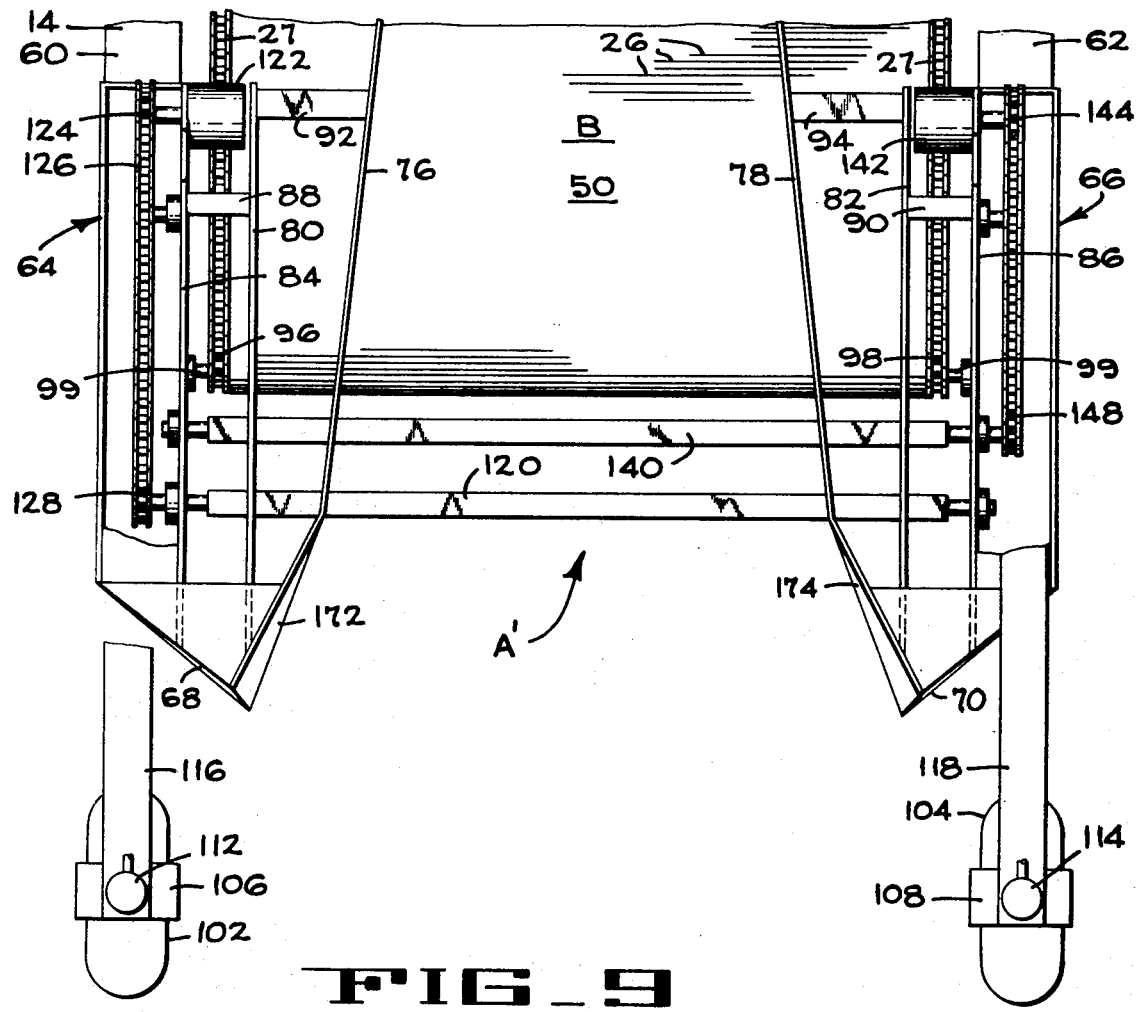
FIG_9
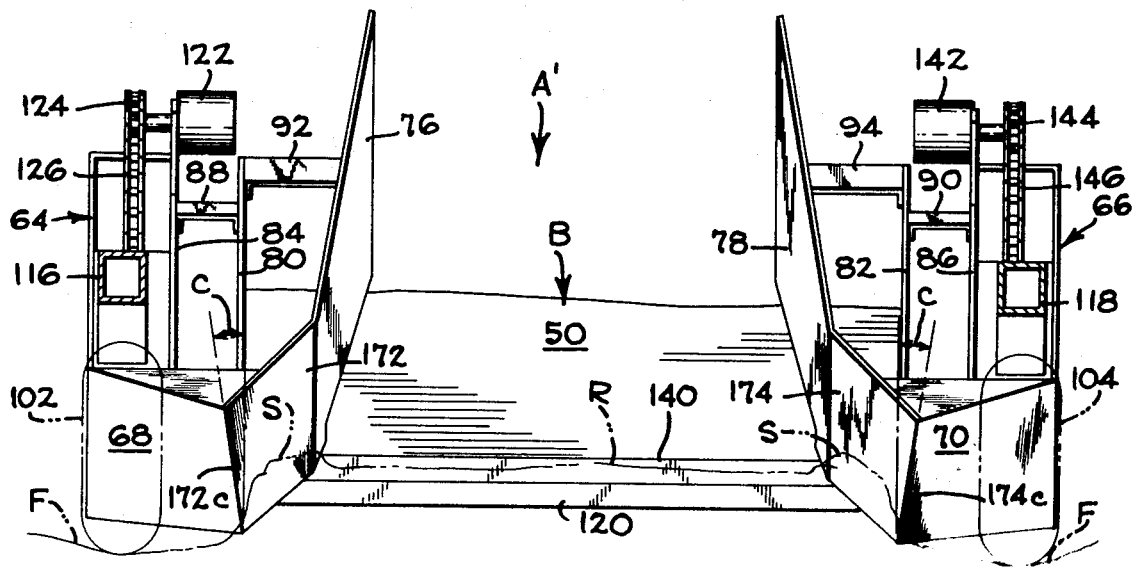
FIG_10

SOIL MOLDING HARVESTER PICKUP

FIELD OF THE INVENTION

The field of the present invention is in vine crop harvesting machines. More specifically, the invention concerns improved pickup apparatus for severing and retrieving the vines and loose fruit at the entrance throat of the machine.

DESCRIPTION OF PRIOR ART

A prior pickup apparatus for this purpose is disclosed in the U.S. patent to Boyce U.S. Pat. No. 3,473,613, Oct. 21, 1969 and assigned to the FMC Corporation, and is more specifically disclosed and claimed in the U.S. patent to Greedy U.S. Pat. No. 3,330,363. July 11, 1967, also assigned to the FMC Corporation, and both disclosures are incorporated herein by reference. In the patented harvesters, two laterally overlapping, counter-rotating discs have their leading sectors disposed an inch or two beneath the surface of the planting ridge to sever the vine at its root system, and to scoop up a layer of soil which thereby conveys loose tomatoes into the harvesting machine without damaging them. However, the patented apparatus has an inherent disadvantage in that increasing the ground speed of the harvester above about 1¼ mph causes the soil to be delivered faster than it can be separated from the fruit and vines.

It has also been proposed to sever the vines with a sickle bar spaced ahead of a pickup conveyor. Although some dirt flows between the sickle bar and the conveyor, loose tomatoes at the sides of the planting ridge are often lost.

The patent to Roberts U.S. Pat. No. 2,954,085, Sept. 27, 1960 discloses "weeder" bars driven by chains, with side boots fitted over the chains. These boots diverge sharply from a zone that is a substantial distance in front of the leading weeder bar and the boots rest on a sole plate that is horizontal during operation.

Clausen, U.S. Pat. No. 2,463,019, Mar. 1, 1949 and Walz et al. U.S. Pat. No. 2,432,956, Dec. 16, 1947 show square pickup or "weeder" bars.

Butter U.S. Pat. No. 2,718,110, Sept. 20, 1955 drives pickup bars at over 200 RPM for salvaging beans.

Hunter et al. U.S. Pat. No. 3,101,786, Aug. 27, 1963; Hunter U.S. Pat. No. 3,108,642, Oct. 29, 1963; and Jackson U.S. Pat. No. 3,186,494, June 1, 1969 also show weeder bars.

SUMMARY OF THE INVENTION

The embodiment of the invention to be described is for use in a tomato harvester. The pickup of the present invention includes longitudinally spaced, rotating bars that extend across the width of a planting ridge to uproot the vines and convey both the vines and loose tomatoes into he harvesting machine, and to simultaneously release most of the soil before it is conveyed into the machine. The bars extend between crowder plates which raise a ramp of soil along each side of the ridge so that the normally convex ridge is reformed into concave shape. This causes loose fruit to roll toward the midplane or center of the ridge and thus prevents it from rolling to inaccessible positions. As a result, a tomato harvester fitted with the pickup of the present invention picks up a higher percentage of loose fruit than prior harvesters at all ground speeds, and hence can be run at a ground speed that is substantially higher than that of prior harvesters, without objectionable loss of loose fruit.

BRIEF DESCRIPTION OF THE DRAWINGS

FIG. 1 is a diagrammatic perspective of the major operating components of a tomato harvesting machine employing the pickup mechanism of the present invention.

FIG. 2 is a diagrammatic plan of the pickup mechanism of the present invention.

FIG. 3 is an enlarged diagrammatic perspective of the pickup mechanism.

FIG. 4 is a diagrammatic perspective of the power train for the pickup mechanism.

FIG. 5 is an enlarged diagrammatic section of the pickup mechanism in operation along a planting ridge.

FIG. 5A is an enlarged diagrammatic view showing certain geometric details.

FIG. 6 is a diagrammatic front elevation, at reduced scale, showing how the pickup reshapes the planting ridge.

FIG. 7 is an enlarged plan view of the pickup.

FIG. 8 is an enlarged front view of the pickup.

FIG. 9 and 10 are views like those of FIGS. 7 and 8 showing the preferred angularity of the crowder plates.

DESCRIPTION OF THE PREFERRED EMBODIMENT

With reference to FIGS. 1 and 2, the present invention concerns a vine pickup or digging mechanism A which is here illustrated as incorporated on the leading end of a tomato harvester 12. The pickup cuts growing vines and conveys the vines with attached and loose tomatoes into the harvester for the usual manual and mechanical operations which separate the market tomatoes from the vines, clods and cull tomatoes. The utility of the pickup mechanism A is not limited to the harvesting machine disclosed, but has applications to other harvesting machine and crops. For this reason, only sufficient details of the harvesting machine 12 are disclosed herein to illustrate one useful environment for the present invention.

Briefly, and with general reference to the broad functions, the harvesting machine 12 includes a frame 14, a portion of which is shown in FIG. 3, supported by drive wheels 16 (only one being shown in FIG. 1) and a steerable front wheel 18 (FIGS. 1 and 5). An engine 20 (FIG. 1) propels the harvester and drives hydraulic pumps 22 and 24 that power various hydraulic motors for the operating components of the machine. The harvester drive train in not critical to the present invention and suitable structure for this purpose appears in the Boyce and Greedy patents.

Immediately behind the pickup mechanism A is a feeder or pickup conveyor B for receiving the severed vines V, attached tomatoes VT and loose tomatoes LT. Some clods D are also picked up and transferred to the feeder conveyor B, although as later mentioned, it is a feature of the invention that the pickup mechanism A pulverizes the dirt and breaks up most of the clods. The feeder conveyor B is formed of slats or rods 26 which are connected at their ends to conveying chains 27 (FIG. 5A), and are provided with protuberances 28 (FIG. 3) to assist in the conveying action.

The vines V and attached tomatoes VT are transferred from the feeder conveyor B to a transfer conveyor T (FIG. 1) which is formed of rods 30, connected to side chains 32, and driven by a hydraulic motor M2. Larger clods of dirt D and most of the loose tomatoes LT are too big to fall between the slats 26 of the feeder conveyor B, and drop onto either of two oppositely running, transverse dirt conveyors D1 and D2, commonly called "dirt belts" in the trade. The dirt conveyors are formed of slats 34, connected to side chains 35, and are driven by hydraulic motors M3 and M4. This structure is described in detail in the aforesaid Boyce patent.

Extending across the front of the harvesting machine is the horizontal flight of a collector conveyor K including an upwardly inclined loading end L which discharges the entire sorted output of the machine into an attendant truck or wagon. Conveyor K is driven by a hydraulic motor M5, and is formed of slats 36 connected to side chains 37. The horizontal flight of the conveyor K is conveniently accessible from sorting platforms E1 and E2. Sorting operators, indicated by the footprints SO on the sorting platforms E1 and E2, inspect the loose tomatoes LT dropped onto the dirt conveyors D1 and D2. The operators select the good loose tomatoes LT and manually place them on the collecting conveyor K for discharge from the machine. Clods of dirt D and cull loose tomatoes LT are discharged by the dirt conveyors D1 and D2 onto the ground.

The vines V and the vine attached tomatoes VT on the transfer conveyor T drop onto a shaker conveyor S, formed of widely spaced slats 38 carried by chains 39, that are driven by a hydraulic motor M6. A shaker mechanism SM, driven by a hydraulic motor M7, is provided to longitudinally reciprocate the upper flight of the shaker conveyor in order to shake off the vine attached tomatoes VT. These tomatoes drop between the slats 38 onto an undershaker conveyor F, also driven by the motor M6. This conveyor comprises slats 40, which are more closely interspaced than the overhead slats 38, and side chains 41. Detached tomatoes VT on the undershaker conveyor F are conveyed rearward and discharged onto one or the other of a pair of transverse collecting conveyors G1 and G2. Hydraulic motors M8 and M9 respectively drive the collecting conveyors G1 and G2. These conveyors are provided with closely interspaced slats 42 carried by side chains 43. A blower not shown provides a rearwardly directed air blast over the conveyors G1 and G2 to remove light trash.

In order to convey the tomatoes from the collecting conveyors past culling and sorting operators, longitudinal collecting and sorting belt conveyors H1 and H2 have forwardly moving conveying flights adjacent sorting platforms, only one platform J2 being shown. Culling operators, indicated by the footprints CO inspect the tomatoes on the conveyors H1 and H2 and remove the cull tomatoes, dirt, vine pieces and any other trash which has not been eliminated by the blower. The remaining good tomatoes VT are discharged onto the previously mentioned collecting conveyor K for discharge from the machine. Hydraulic motors M11 and M12, respectively, power the conveyors H1 and H2. Reference is made to the patents to Looker, U.S. Pat. No. 3,301,331, issued Jan. 31, 1967; and Csimma U.S. Pat. No. 3,340,935, issued Sept. 12, 1967, assigned to the FMC Corporation which claim some of the above features.

As will be presently described and explained, the pickup A of the present invention pulverizes the ground so that fewer and smaller clods are formed and conveyed into the harvesting machine. Also, the pickup of the present invention enables the retrieval of the vines and loose tomatoes, at higher than usual ground speeds of the harvesting machine, without the expected disadvantage of picking up excess dirt. There are also additional important advantages afforded by the present invention, as will be explained in the following detailed description of the digging mechanism A.

With reference to FIGS. 2, 3, 7, and 8, although the digging mechanism A may be adapted to various harvesters it is herein illustrated in cooperative relation with a pickup or takeaway conveyor section 50 which forms the lower portion of the previously mentioned feeder conveyor B. The crop receiving conveyor section 50 is disposed at a low inclination to the horizontal, in order to inhibit roll-back of the harvested material.

The pickup mechanism A and the front end of the conveyor B are pivotally mounted on the forward end of the harvester frame 14. As best seen in FIG. 3, the frame 14 has depending struts 51,52 which connect at their lower ends to forwardly extending frame elements 53,54. The latter elements pivotally support the digger assembly A and the forward end 50 of the pickup conveyor B by means of aligned pivots 56 (FIG. 5) and 58 (FIG. 3) mounted in the frame elements 53,54.

The framework for the pickup A and the conveyor section 50 includes arms 60,62 that project forwardly from the pivots 56,58 just described, so that the pickup assembly can follow the contour of the ground. Welded to the pivoted arms 60,62 are box-like housings, 64,66, the forward walls of which form outwardly diverging deflector and guard plates 68,70. Extending rearwardly from the leading edges of the guard plates 68,70 are the soil crowder and ramp forming plates 72,74 of the present invention. These crowder plates converge rearwardly at an included angle a of about 45° (FIG. 7) which means that each crowder plate is inclined relative to the fore and aft axis of the conveyor section 50 (the path of advance of the harvester) at an angle of about 22.5°.

Projecting rearwardly from the crowder plates 72, 74 are harvest guiding and compacting baffle plates 76,78. The angle of convergence of the plates 76,78 is much less than the angle a of the crowder plates 72,74.

In order to stiffen the crowder and baffle plate assembly, side gusset plates 80,82 (FIG. 7) extend rearwardly from the spices 72b, 74b of the crowder plates and their associated guard plates. The side plates 80,82 are braced to inner side plates 84,86 of the box-like structure 64,66 previously described by means of brackets 88,90 (FIG. 7). The crop baffle plates 76,78 are braced to the side plates 80,82 by means of brackets 92,94.

As seen in FIG. 7, the forward or fruit receiving end of the section 50 of the pickup conveyor B is supported in the plates 84,86 by means of chain sprockets 96,98 on a transverse shaft 99. The conveyor chains 27 are trained around these sprockets as seen in FIGS. 5A and 7 and around upper direction changing idler rollers 100,100a, (FIG. 3) a lower roller 101, (FIG. 5) and another lower roller not shown, on pivots 56 and 58.

In order to support the front end of the pickup assembly at the desired height relative to the ridge of soil containing the fruit to be harvested, caster-type gauge wheels 102,104 are mounted ahead of the pickup or digger assembly A (FIG. 5). These wheels are mounted in forks 106,108 and each fork connects to a piston, such as the piston 110 shown in FIG. 5, of hydraulic cylinders 112,114. These cylinders are mounted on arms 116,118 (FIG. 3) that project forwardly from the box-like structures 64,66 previously described. The hydraulic cylinders, 112,114 can be controlled and valved remotely by means conventional in this art to raise the arms 115,118 supported by the wheels and hence to change the elevation of the digger mechanism A. As seen in FIGS. 2, 5, 6, and 8 the wheels 102,104 are steered to ride in the furrows F formed between the ridges of soil R containing the planting bed.

As seen in FIG. 5, in the preferred embodiment of the invention the vines V are severed below the surface of the soil and the vines and fruit transported back to the conveyor section 50 by a pair of rotating "weeder" bars. The leading bar 120 is of square cross section (FIGS. 5 and 5A) with turned down ends that are rotatably mounted in the side plates 84,86 (FIG. 7). During harvesting this bar is adjusted to rotate somewhat beneath the surface of the soil forming the planting ridge R (FIG. 5) by selective adjustment of the piston and cylinder assemblies for the gauge wheels 102,104.

The leading bar 120 is rotated in a clockwise direction as viewed in FIGS. 3, 4, and 5 by a hydraulic motor 122 supported on an ear upstanding from the plate 84 (FIG. 3). As seen in FIG. 4, this motor drives a sprocket 124, a chain 126, and a sprocket 128 on the end of the weeder bar 120. The chain 126 passes over an idler 130.

Spaced rearwardly and somewhat above the cutter bar 120 (FIGS. 5 and 5A) is a pickup and elevating bar 140 which rotates in the same direction as the cutter bar. The elevator bar 140 is driven from the other side of the harvester by a hydraulic motor 142 on the plate 86 (FIGS. 3, 4 and 7) driving a sprocket 144, a chain 146, and a sprocket 148 on the end of the elevator bar 140. The chain 146 passes over an idler sprocket 150, by means of a throttling control valve, not shown, the speed of the bar-rotating hydraulic motors 122,142 can be independently regulated. It has been found that a speed of about 200–300 RPM for the cutter and elevator bars 120,140 produce effective results in most tomato harvesting operations.

The diagram of FIG. 5A gives geometric relationships that have been found effective in a tomato harvesting machine. The lower margin or edge 72a of the crowder plate 72 (this applies to the lower edge of the crowder plate 74 also) is inclined upwardly from the horizontal from an angle $b$ of about 20°. This angle of inclination will vary slightly when the wheels 102,104 are vertically adjusted in accordance with the depth of the furroughs F (FIGS. 5 and 6) relative to the height of the planting ridges R. The upward inclination $b$ of the lower margins of the crowder plates is an important feature of the present invention in that it provides some relief or clearance for the flowing loose soil developed by the crowding action of the plates. This relief prevents pile up and blocking of forward motion of the weeder bar 120 through the soil ridge R.

The bars 120,140 are about 1.25 inches square and as seen in FIG. 5A the plane of their upper surfaces is disposed a distance $w$ below the plane of the upper reach of the conveyor 50 by the relatively short distance of about seven-eighths inch. The rearward bar 140 is mounted forward of the leading end of the conveyor 50 by a distance $x$ of about 1.5 to 2 inches. The cutter bar 120 is disposed forwardly of the elevator bar 140 by a distance $y$ of about 3 inches. The lowermost nose portion 72b of the crowder plate 72 (as well as the nose 74b of the crowder plate 74) is disposed ahead of the cutter bar 120 by a distance $z$ of about 10 to 11 inches.

The relatively long dimension $z$ of the crowder plates 72,74 coupled with their relatively shallow inclination angle (half the angle $a$ FIG. 7) provides a gentle, yet effective ramp forming action on the planting ridge R in accordance with the present invention. The spacing $y$ between the bars 120,140 permits loose soil to pass down between the bars and not only facilitates the ramp forming action of the crowder plates, but minimizes the amount of soil that reaches the conveyor 50. More loose soil can pass down between the spacing $x$ between the elevator bar 140 and the front end of the conveyor 50.

The operation of the pickup mechanism of the present invention is best shown in FIGS. 5 and 6. As mentioned previously, the gauge wheels 102,104 run down the furroughs F and the wheels are adjusted so that the cutting bar 120 is operated just below the surface of the soil of the planting ridge R. With this adjustment, the elevator bar 140 will be rotating at about the surface of the ridge. The cutting bar 120 severs the roots of the vines V (FIG. 5) and the lifting action of the forward portion of the bar elevates the vines and urges them rearwardly of the harvester. Loose soil churned up by the cutting bar 120 flows rearwardly of the bar and down beneath the elevating bar 140. The elevating bar 140 picks up the vines and loose fruit associated therewith and boosts them over the small height $w$ onto the leading or vine receiving portion of the conveyor 50.

The crowder plates 72,74 cooperate with the bars 120,140 to retrieve loose fruit LT that might otherwise be left behind. For example, by the time the crop is to be harvested, the planting ridge R will usually have weathered into the convex form indicated in FIG. 8. Also, it is customary to harvest when most of the tomatoes are ripe, which means that many ripe and loose tomatoes have dropped from their vines and are simply resting on the ground. Those loose tomatoes which are disposed at the sides of the ridge R adjacent the furroughs F are beneath the crown of the ridge, rendering pickup of these fruits difficult. However, the crowder plates 72,74, as they advance down the ridge R ahead of the rotating bars 120, 140, reform and shape the soil at the sides of the ridge into side ramps S best illustrated in FIG. 6. This reforming of the ridge provides surfaces at each side of the ridge which slope towards the midplane of the ridge. As a result of this action, loose fruit, such as the loose tomatoes LT illustrated in FIG. 6, will be elevated by the ridge and if they move laterally at all, such motion will be toward the midplane of the ridge for pickup by the weeder bar 120 and the elevator bar 140. During this action, the cutter bar 120, which will have an average depth of an inch or so, in churning the soil and uprooting the plants as previously described, and much of the soil crowded up into the ramps S will pass down between the bars 120,140.

The upwardly inclined lower margins 72a, 74a of the crowder plates 72,74 provide a relief action which makes possible a smooth, low power consumption ramp-forming operation, without jamming or blocking the forward passage of the harvester through the field. The rotating bars 120,140 also break up clods which might otherwise be introduced intact into the conveyor system and thus put additional loads on the sorting system that is usually incorporated in tomato harvesters of this type. As a result of these actions, a harvester equipped with a pickup of the present invention can move down rows of growing tomatoes when loose fruit are lying on the ground and pick up more fruit at a faster ground speed than can prior devices.

The baffle plates 76,78 compact the mass of vines and fruit conveyed by the conveyor B and assist in their passage across the gap at the transfer conveyor T (FIG. 1).

INCLINED CROWDER PLATES

FIGS. 9 and 10 illustrate a modified and preferred crowder plate design which has been found to require even less power for advancing the pickup down a planting ridge and reforming it into side ramps S than the form previously described. Except for the crowder plates, the parts of the pickup assembly A are like those of the corresponding parts A previously described and hence the same reference characters are employed. The only significant difference represented by the form of FIGS. 9 and 10 over that previously illustrated is that the leading edges of the crowder plates 172,174 (unlike the crowder plates 72,74 previously described) are inclined from the vertical so that they diverge in an upward direction. As illustrated in FIG. 10, the leading edge 172c of the crowder plate 172 and the corresponding edge 174c of the crowder plate 174 are outwardly inclined from the vertical by a small angle $c$ about 5° to 10°, an inclination angle of about 7° being disclosed in the embodiment shown in FIGS. 9 and 10.

As mentioned, this smooths out the ramp forming action and reduces the power required to advance the crowder plates through the soil ridge R. Otherwise the mode of operation of the form of FIGS. 9 and 10 is like that previously described and need not be explained further.

Although the best mode contemplated for carrying out the present invention has been herein shown and described, it will be apparent that modification and variation may be made without departing from what is regarded to be the subject of the invention.

What we claim is:

1. In a harvester for vine crops such as tomatoes or the like which grow on an elongate planting ridge of soil, said harvester being of the type having a main frame, a crop pickup unit pivoted at its rearward end to the main harvester frame, vertically adjustable gauge wheel means for supporting the leading end of said pickup unit, a rotating cutter bar mounted in said pickup unit and spanning the planting ridge, soil crowder plates mounted on said pickup unit adjacent each end of said cutter bar; said crowder plates rearwardly converging from a zone ahead of said cutter bar to said cutter bar, a baffle plate extending rearwardly from each crowder plate, and a pickup conveyor in said unit for receiving the crop, the improvement comprising a rotating elevator bar mounted in said pickup unit, said elevator bar being adjacent the leading end of said conveyor and spaced rearwardly of and somewhat above said cutter bar, the lower edges of said crowder and baffle plates extending upwardly from the leading tips of the crowder plates over the tops of said rotating bars and over said elevator so that when said harvester is operated with the cutter bar just below the soil surface and the elevator bar above it, a soil relief zone is provided at the ends of said rotating bars for minimizing soil pick up by the conveyor.

2. The harvester of claim 1, wherein said crowder plates diverge upwardly so that each plate forces the soil both upward and inward to facilitate the formation of soil ramps at the edges of the planting ridge.

3. The harvester of claim 1, wherein the drive means for said rotating cutter and elevator bars comprises an individually variable speed hydraulic motor for each bar to provide the optimum speed relation between the cutter and elevator bars.

* * * * *